US012047756B1

(12) United States Patent
Chang et al.

(10) Patent No.: US 12,047,756 B1
(45) **Date of Patent: *Jul. 23, 2024**

(54) ANALYZING AUDIO SIGNALS FOR DEVICE SELECTION

(71) Applicant: Amazon Technologies, Inc., Seattle, WA (US)

(72) Inventors: Samuel Henry Chang, San Jose, CA (US); Wai Chung Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,680

(22) Filed: Apr. 18, 2022

Related U.S. Application Data

(63) Continuation of application No. 15/418,973, filed on Jan. 30, 2017, now Pat. No. 11,317,201, which is a continuation of application No. 13/535,135, filed on Jun. 27, 2012, now Pat. No. 9,560,446.

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01); *H04R 2201/403* (2013.01); *H04R 2430/20* (2013.01)

(58) Field of Classification Search
CPC .. H04R 3/005; H04R 1/406; H04R 2201/403; H04R 2430/20; G10K 11/1784; H04W 4/029
USPC ............................................................ 381/92
See application file for complete search history.

(56) References Cited

U.S. PATENT DOCUMENTS

| | | | | |
|---|---|---|---|---|
| 6,526,335 | B1 * | 2/2003 | Treyz | H04W 4/029 701/1 |
| 7,134,080 | B2 | 11/2006 | Kjeldsen et al. | |
| 8,189,410 | B1 | 5/2012 | Morton | |
| 8,687,796 | B2 * | 4/2014 | Sun | H04M 19/044 379/392.01 |
| 8,958,571 | B2 | 2/2015 | Kwatra et al. | |
| 8,983,089 | B1 | 3/2015 | Chu et al. | |
| 9,113,240 | B2 | 8/2015 | Ramakrishnan et al. | |
| 2006/0215854 | A1 | 9/2006 | Suzuki et al. | |

(Continued)

FOREIGN PATENT DOCUMENTS

| | | | |
|---|---|---|---|
| JP | 2001333164 A | * | 11/2001 |
| WO | WO2011088053 | | 7/2011 |

OTHER PUBLICATIONS

Office Action for U.S. Appl. No. 15/418,973, dated Jun. 12, 2020, Chang, "Analyzing Audio Signals for Device Selection", 9 Pages.

(Continued)

*Primary Examiner* — Md S Elahee
(74) *Attorney, Agent, or Firm* — Lee & Hayes, P.C.

(57) ABSTRACT

A system efficiently selects at least one device from multiple devices based on received audio signals. In some instances, the system receives audio signals from devices that each comprise at least one microphone. A respective audio signal of the audio signals includes a representation of a sound originating from a location. The system then determines a device to be used to respond to the sound. In some instances, the system analyzes times in which the received audio signals that represent the sound are generated and/or volumes of the sound as represented by the received audio signals. The system can then select the device based on the analysis.

20 Claims, 7 Drawing Sheets

(56) References Cited

U.S. PATENT DOCUMENTS

| | | | |
|---|---|---|---|
| 2009/0003623 | A1 | 1/2009 | Burnett |
| 2009/0110225 | A1 | 4/2009 | Kim |
| 2010/0034397 | A1 | 2/2010 | Nakadai et al. |
| 2010/0054085 | A1 | 3/2010 | Wolff et al. |
| 2010/0111329 | A1 | 5/2010 | Namba et al. |
| 2011/0019835 | A1 | 1/2011 | Schmidt et al. |
| 2011/0033063 | A1 | 2/2011 | McGrath et al. |
| 2012/0223885 | A1 | 9/2012 | Perez |

OTHER PUBLICATIONS

Office Action for U.S. Appl. No. 15/418,973, dated Oct. 16, 2018, Chang et al., "Analyzing Audio Signals for Device Selection", 6 pages.

Office action for U.S. Appl. No. 13/535,135, mailed on Mar. 3, 2016, Chang et al., "Sound Source Locator With Distributed Microphone Array", 14 pages.

Office action for U.S. Appl. No. 13/535,135, dated Apr. 3, 2015, Chang et al., "Sound Source Locator With Distributed Microphone Array", 12 pages.

Office Action for U.S. Appl. No. 15/418,973, dated May 1, 2019, Chang, "Analyzing Audio Signals for Device Selection", 7 pages.

Office Action for U.S. Appl. No. 15/418,973, dated Sep. 28, 2021, Chang, "Analyzing Audio Signals for Device Selection", 11 pages.

Office Action for U.S. Appl. No. 15/418,973, dated Sep. 6, 2019, Chang, "Analyzing Audio Signals for Device Selection", 6 pages.

Pinhanez, "The Everywhere Displays Projector: A Device to Create Ubiquitous Graphical Interfaces", IBM Thomas Watson Research Center, Ubicomp 2001, 18 pages.

* cited by examiner

ANALYZING AUDIO SIGNALS FOR DEVICE SELECTION

RELATED APPLICATIONS

This application claims priority to and is a continuation of U.S. patent application Ser. No. 15/418,973, filed on Jan. 30, 2017, which claims priority to U.S. patent application Ser. No. 13/535,135, filed on Jun. 27, 2012, the entire contents of which are incorporated herein by reference.

BACKGROUND

Sound source localization refers to a listener's ability to identify the location or origin of a detected sound in direction and distance. The human auditory system uses several cues for sound source localization, including time and sound-level differences between two ears, timing analysis, correlation analysis, and pattern matching.

Traditionally, non-iterative techniques for localizing a source employ localization formulas that are derived from linear least-squares "equation error" minimization, while others are based on geometrical relations between the sensors and the source. Signals propagating from a source arrive at the sensors at times dependent on the source-sensor geometry and characteristics of the transmission medium. Measurable differences in the arrival times of source signals among the sensors are used to infer the location of the source. In a constant velocity medium, the time differences of arrival (TDOA) are proportional to differences in source-sensor range (RD). However, finding the source location from the RD measurements is typically a cumbersome and expensive computation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
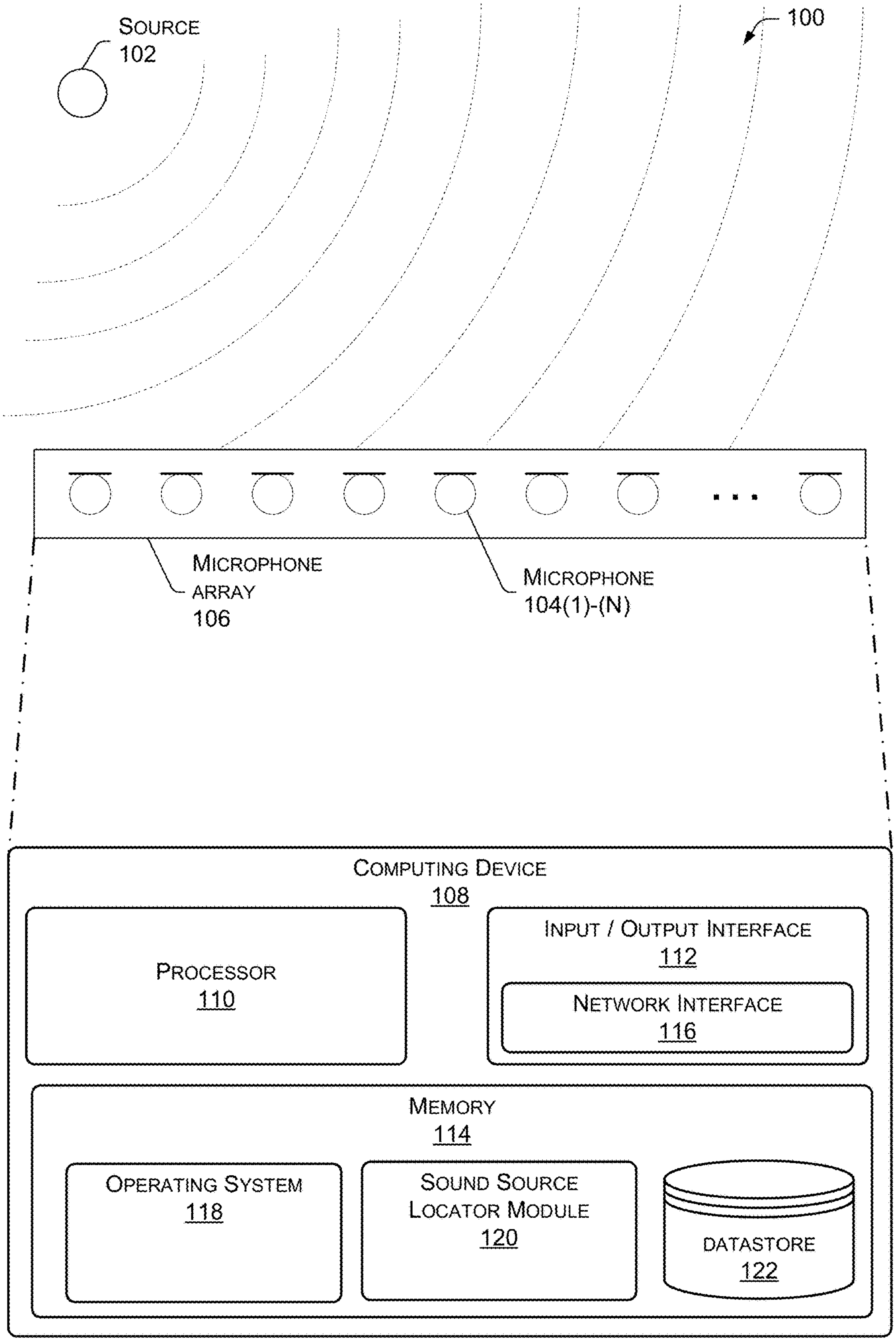
FIG. 1 shows an illustrative environment including a hardware and logical configuration of a computing device according to some implementations.

A smart sound source locator determines the location from which a sound originates according to attributes of the signal representing the sound or corresponding to the sound being generated at a plurality of distributed microphones. For example, the microphones can be distributed around a building, about a room, or in an augmented reality environment. The microphones can be distributed in physical or logical arrays, and can be placed non-equidistant to each other. By increasing the number of microphones receiving the sound, localization accuracy can be improved. However, associated hardware and computational costs will also be increased as the number of microphones is increased.

As each of the microphones generates the signal corresponding to the sound being detected, attributes of the sound can be recorded in association with an identity of each of the microphones. For example, recorded attributes of the sound can include the time each of the microphones generates the signal representing the sound and a value corresponding to the volume of the sound as it is detected at each of the microphones.

By accessing the recorded attributes of the sound, selections of particular microphones, microphone arrays, or other groups of microphones can be informed to control the computational costs associated with determining the source of the sound. When a position of each microphone relative to one another is known at the time each microphone generates the signal representing the sound, comparison of such attributes can be used to filter the microphones employed for the specific localization while maintaining the improved localization results from increasing the number of microphones.

Time-difference-of-arrival (TDOA) is one computation used to determine the location of the source of a sound. TDOA represents the temporal difference between when the sound is detected at two or more microphones. Similarly, volume-difference-at-arrival (VDAA) is another computation that can be used to determine the location of the source of a sound. VDAA represents the difference in the level of the sound at the time the sound is detected at two or more microphones. In various embodiments, TDOA and/or VDAA can be calculated based on differences between the signals representing the sound as generated at two or more microphones. For example, TDOA can be calculated based on a difference between when the signal representing the sound is generated at two or more microphones. Similarly, VDAA can be calculated based on a difference between volumes of the sound as represented by the respective signals representing the sound as generated at two or more microphones.

Selection of microphones with larger identified TDOA and/or VDAA can provide more accurate sound source localization while minimizing the errors introduced by noise.

The following description begins with a discussion of example sound source localization devices in environments including an augmented reality environment. The description concludes with a discussion of techniques for sound source localization in the described environments.

Illustrative System

FIG. 1 shows an illustrative system 100 in which a source 102 produces a sound that is detected by multiple microphones 104(1)-(N) that together form a microphone array 106, each microphone 104(1)-(N) generating a signal corresponding to the sound. One implementation in an augmented reality environment is provided below in more detail with reference to FIG. 2.

Associated with each microphone 104 or with the microphone array 106 is a computing device 108 that can be located within the environment of the microphone array 106 or disposed at another location external to the environment. Each microphone 104 or microphone array 106 can be a part of the computing device 108, or alternatively connected to the computing device 108 via a wired network, a wireless network, or a combination of the two. The computing device 108 has a processor 110, an input/output interface 112, and a memory 114. The processor 110 can include one or more processors configured to execute instructions. The instructions can be stored in memory 114, or in other memory accessible to the processor 110, such as storage in cloud-base resources.

The input/output interface 112 can be configured to couple the computing device 108 to other components, such as projectors, cameras, other microphones 104, other microphone arrays 106, augmented reality functional nodes (ARFNs), other computing devices 108, and so forth. The input/output interface 112 can further include a network interface 116 that facilitates connection to a remote computing system, such as cloud computing resources. The network interface 116 enables access to one or more network types, including wired and wireless networks. More generally, the coupling between the computing device 108 and any components can be via wired technologies (e.g., wires, fiber optic cable, etc.), wireless technologies (e.g., RF, cellular, satellite, Bluetooth, etc.), or other connection technologies.

The memory 114 includes computer-readable storage media ("CRSM"). The CRSM can be any available physical media accessible by a computing device to implement the instructions stored thereon. CRSM can include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other physical medium which can be used to store the desired information and which can be accessed by a computing device.

Several modules such as instructions, datastores, and so forth can be stored within the memory 114 and configured to execute on a processor, such as the processor 110. An operating system 118 is configured to manage hardware and services within and coupled to the computing device 108 for the benefit of other modules.

A sound source locator module 120 is configured to determine a location of the sound source 102 relative to the microphones 104 or microphone arrays 106 based on attributes of the signal representing the sound as generated at the microphones or the microphone arrays. The source locator module 120 can use a variety of techniques including geometric modeling, time-difference-of-arrival (TDOA), volume-difference-at-arrival (VDAA), and so forth. Various TDOA techniques can be used, including the closed-form least-squares source location estimation from range-difference measurements techniques described by Smith and Abel, IEEE Transactions on Acoustics, Speech, and Signal Processing, Vol. ASSP-35, No. 12, Dec. 1987. Some or other techniques are described in U.S. patent application Ser. No. 13/168,759, entitled "Time Difference of Arrival Determination with Direct Sound", and filed on Jun. 24, 2011; U.S. patent application Ser. No. 13/169,826, entitled "Estimation of Time Delay of Arrival", and filed on Jun. 27, 2011; and U.S. patent application Ser. No. 13/305,189, entitled "Sound Source Localization Using Multiple Microphone Arrays," and filed on Nov. 28, 2011. These applications are hereby incorporated by reference.

Depending on the techniques used, the attributes used by the sound source locator module 120 may include volume, a signature, a pitch, a frequency domain transfer, and so forth. These attributes are recorded at each of the microphones 104 in the array 106. As shown in FIG. 1, when a sound is emitted from the source 102, sound waves are emanated toward the array of microphones. A signal representing the sound, and/or attributes thereof, is generated at each microphone 104 in the array. Some of the attributes may vary across the array, such as volume and/or detection time.

In some implementations, a datastore 122 stores attributes of the signal corresponding to the sound as generated at the different microphones 104. For example, datastore 122 can store attributes of the sound, or a representation of the sound itself, as generated at the different microphones 104 and/or microphone arrays 106 for use in later processing.

The sound source locator module 120 uses attributes collected at the microphones to estimate a location of the source 102. The sound source locator 120 employs an iterative technique in which it selects different sets of the microphones 104 and makes corresponding calculations of the location of the source 102. For instance, suppose the microphone array 106 has ten microphones 104 (i.e., N=10). Upon emission of the sound from source 102, the sound reaches the microphones 104(1)-(10) at different times, at different volumes, or at some other measureable attribute. The sound source location module 120 then selects a signal representing the sound as generated by a set of microphones, such as microphones 1-5, in an effort to locate the source 102. This produces a first estimate. The module 120 then selects a signal representing the sound as generated by a new set of microphones, such as microphones 1, 2, 3, 4, and 6 and computes a second location estimate. The module 120 continues with a signal representing the sound as generated by a new set of microphones, such as 1, 2, 3, 4, and 7, and computes a third location estimate. This process can be continued for possibly every permutation of the ten microphones.

From the multiple location estimates, the sound source location module 120 attempts to locate more precisely the source 102. The module 120 may pick the perceived best estimate from the collection of estimates. Alternatively, the module 120 may average the estimates to find the best source location. As still another alternative, the sound source location module 120 may use some other aggregation or statistical approach of signals representing the sound as generated by the multiple sets to identify the source.

In some implementations, every permutation of microphone sets may be used. In others, however, the sound source location may optimize the process by selecting signals representing the sound as generated by sets of microphones more likely to yield the best results given early calculations. For instance, if the direct path of the source 102 to one microphone is blocked or occluded by some objects, the location estimate from a set of microphones that include said microphone will not be accurate, since the occlusion affects the signal property leading to incorrect TDOA estimates. Accordingly, the module 120 can use thresholds or other mechanisms to ensure that certain measurements, attributes, and calculations are suitable for use.

Illustrative Environment

Figure 2:
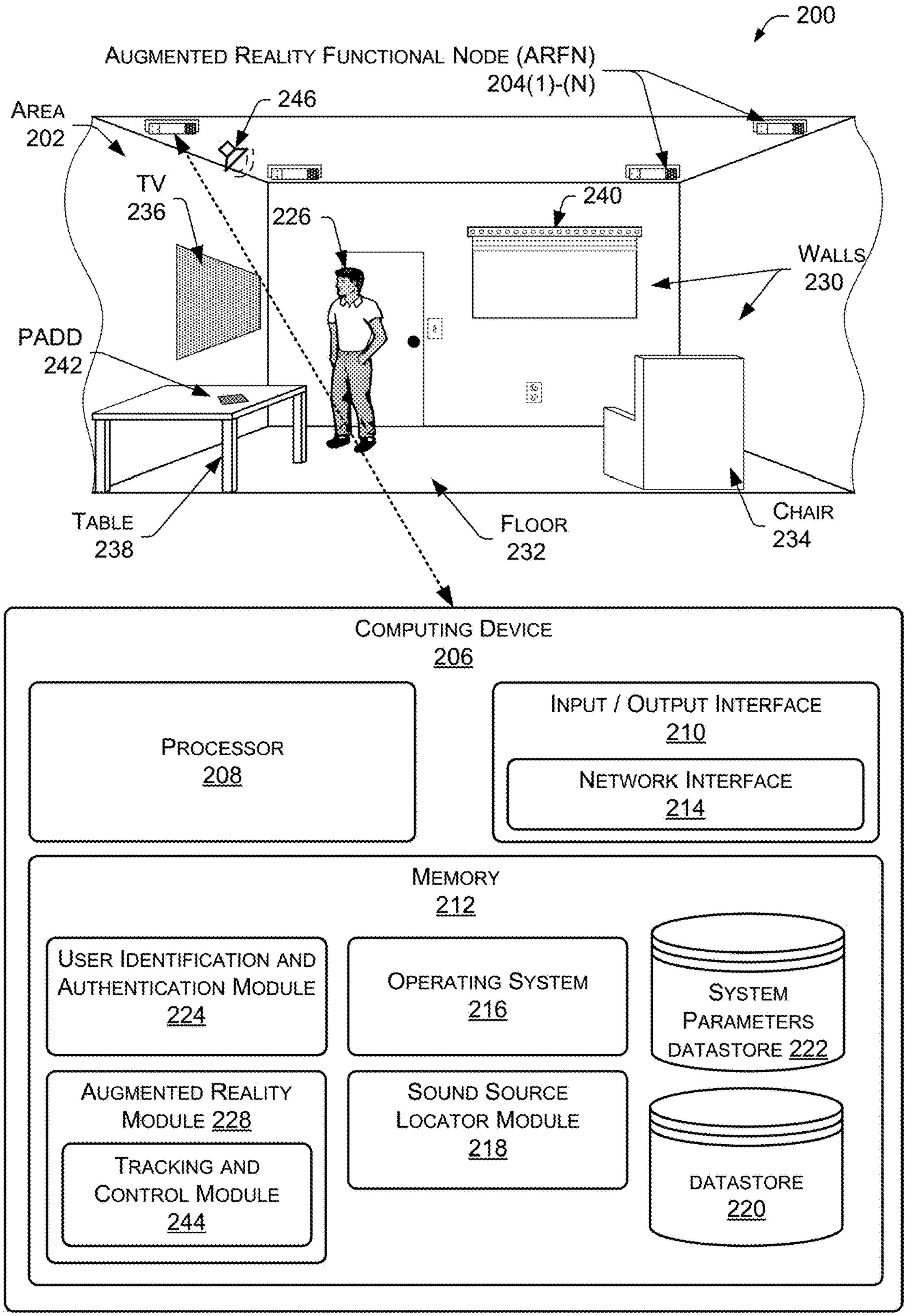
FIG. 2 shows an illustrative scene within an augmented reality environment that includes a microphone array and an augmented reality functional node (ARFN) located in the scene and an associated computing device.
Figure 3:
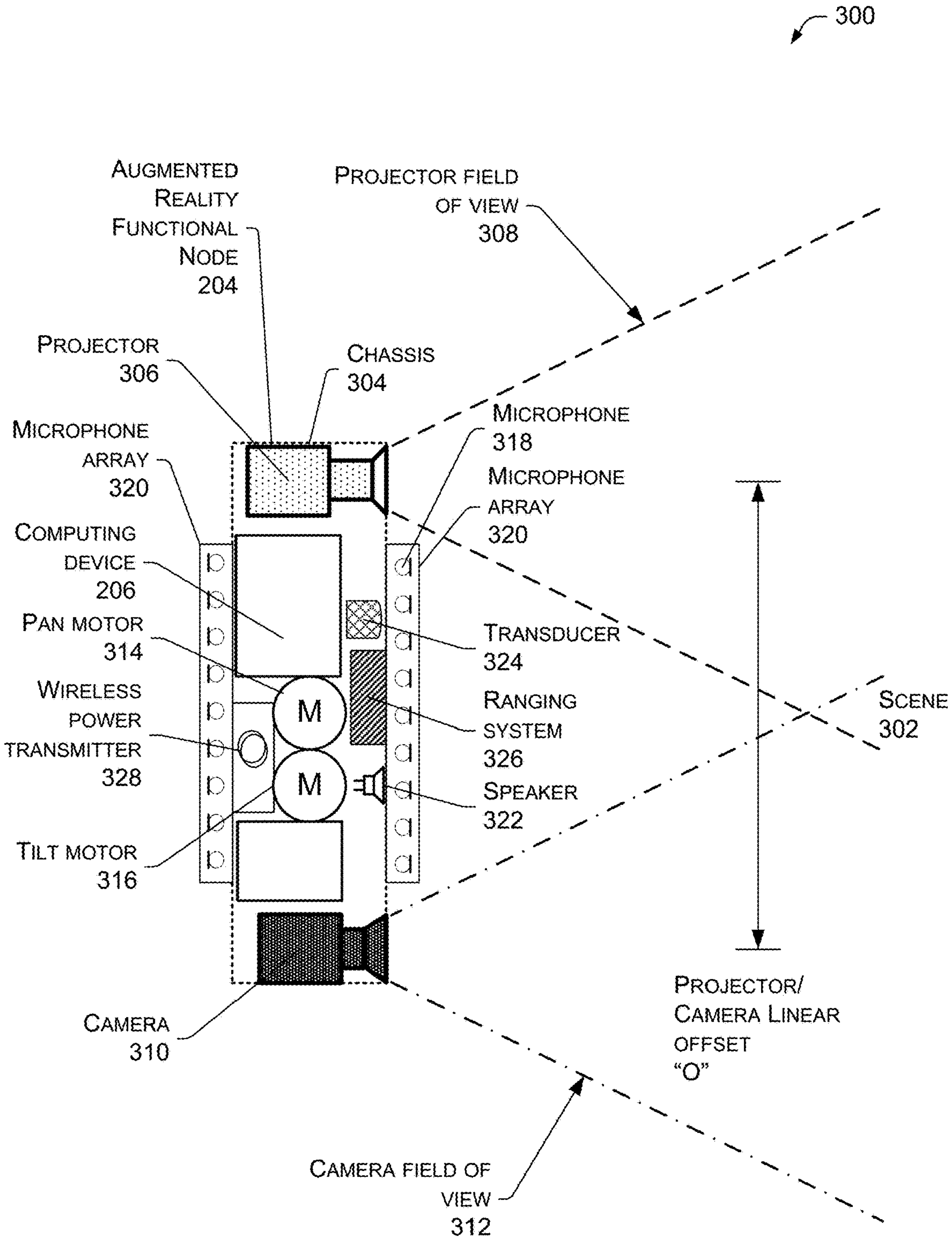
FIG. 3 shows an illustrative augmented reality functional node, which includes microphone arrays and a computing device, along with other selected components.

FIG. 2 shows an illustrative augmented reality environment 200 created within a scene, and hosted within an environmental area 202, which in this case is a room. Multiple augmented reality functional nodes (ARFN) 204 (1)-(N) contain projectors, cameras, microphones 104 or microphone arrays 106, and computing resources that are used to generate and control the augmented reality environment 200. In this illustration, four ARFNs 204(1)-(4) are positioned around the scene. In other implementations, different types of ARFNs 204 can be used and any number of ARFNs 204 can be positioned in any number of arrangements, such as on or in the ceiling, on or in the wall, on or in the floor, on or in pieces of furniture, as lighting fixtures such as lamps, and so forth. The ARFNs 204 may each be equipped with an array of microphones. FIG. 3 provides one implementation of a microphone array 106 as a component of ARFN 204 in more detail.

Associated with each ARFN 204(1)-(4), or with a collection of ARFNs, is a computing device 206, which can be located within the augmented reality environment 200 or disposed at another location external to it, or even external to the area 202. Each ARFN 204 can be connected to the computing device 206 via a wired network, a wireless network, or a combination of the two. The computing device 206 has a processor 208, an input/output interface 210, and a memory 212. The processor 208 can include one or more processors configured to execute instructions. The instructions can be stored in memory 212, or in other memory accessible to the processor 208, such as storage in cloud-base resources.

The input/output interface 210 can be configured to couple the computing device 206 to other components, such as projectors, cameras, microphones 104 or microphone arrays 106, other ARFNs 204, other computing devices 206, and so forth. The input/output interface 210 can further include a network interface 214 that facilitates connection to a remote computing system, such as cloud computing resources. The network interface 214 enables access to one or more network types, including wired and wireless networks. More generally, the coupling between the computing device 206 and any components can be via wired technologies (e.g., wires, fiber optic cable, etc.), wireless technologies (e.g., RF, cellular, satellite, Bluetooth, etc.), or other connection technologies.

The memory 212 includes computer-readable storage media ("CRSM"). The CRSM can be any available physical media accessible by a computing device to implement the instructions stored thereon. CRSM can include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other physical medium which can be used to store the desired information and which can be accessed by a computing device.

Several modules such as instructions, datastores, and so forth can be stored within the memory 212 and configured to execute on a processor, such as the processor 208. An operating system 216 is configured to manage hardware and services within and coupled to the computing device 206 for the benefit of other modules.

A sound source locator module 218, similar to that described above with respect to FIG. 1, can be included to determine a location of a sound source relative to the microphone array associated with one or more ARFNs 204. In some implementations, a datastore 220 stores attributes of the signal representing the sound as generated by the different microphones.

A system parameters datastore 222 is configured to maintain information about the state of the computing device 206, the input/output devices of the ARFN 204, and so forth. For example, system parameters can include current pan and tilt settings of the cameras and projectors and different volume setting of speakers. As used in this disclosure, the datastores includes lists, arrays, databases, and other data structures used to provide storage and retrieval of data.

A user identification and authentication module 224 is stored in memory 212 and executed on the processor 208 to use one or more techniques to verify users within the environment 200. In this example, a user 226 is shown within the room. In one implementation, the user can provide verbal input and the module 224 verifies the user through an audio profile match.

In another implementation, the ARFN 204 can capture an image of the user's face and the user identification and authentication module 224 reconstructs 3D representations of the user's face. Alternatively, other biometric profiles can be computed, such as a face profile that includes key biometric parameters such as distance between eyes, location of nose relative to eyes, etc. In another implementation, the user identification and authentication module 224 can utilize a secondary test associated with a sound sequence made by the user, such as matching a voiceprint of a predetermined phrase spoken by the user from a particular location in the room. In another implementation, the room can be equipped with other mechanisms used to capture one or more biometric parameters pertaining to the user, and feed this information to the user identification and authentication module 224.

An augmented reality module 228 is configured to generate augmented reality output in concert with the physical environment. The augmented reality module 228 can employ microphones 104 or microphone arrays 106 embedded in essentially any surface, object, or device within the environment 200 to interact with the user 226. In this example, the room has walls 230, a floor 232, a chair 234, a TV 236, a table 238, a cornice 240 and a projection accessory display device (PADD) 242. The PADD 242 can be essentially any device for use within an augmented reality environment, and can be provided in several form factors, including a tablet, coaster, placemat, tablecloth, countertop, tabletop, and so forth. A projection surface on the PADD 242 facilitates presentation of an image generated by an image projector, such as a projector that is part of an augmented reality functional node (ARFN) 204. The PADD 242 can range from entirely non-active, non-electronic, mechanical surfaces to full functioning, full processing and electronic devices.

The augmented reality module 228 includes a tracking and control module 244 configured to track one or more users 226 within the scene.

The ARFNs 204 and computing components of device 206 that have been described thus far can operate to create an augmented reality environment in which images are projected onto various surfaces and items in the room, and the user 226 (or other users not pictured) can interact with the images. The users' movements, voice commands, and other interactions are captured by the ARFNs 204 to facilitate user input to the environment 200.

In some implementations, a noise cancellation system 246 can be provided to reduce ambient noise that is generated by sources external to the augmented reality environment. The noise cancellation system detects sound waves and generates other waves that effectively cancel the sound waves, thereby reducing the volume level of noise.

FIG. 3 shows an illustrative schematic 300 of the augmented reality functional node (ARFN) 204 and selected components. The ARFN 204 is configured to scan at least a portion of a scene 302 and the sounds and objects therein. The ARFN 204 can also be configured to provide augmented reality output, such as images, sounds, and so forth.

A chassis 304 holds the components of the ARFN 204. Within the chassis 304 can be disposed a projector 306 that generates and projects images into the environment. These images can be visible light images perceptible to the user, visible light images imperceptible to the user, images with non-visible light, or a combination thereof. This projector 306 can be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 306 has a projector field of view 308 that describes a particular solid angle. The projector field of view 308 can vary according to changes in the configuration of the projector. For example, the projector field of view 308 can narrow upon application of an optical zoom to the projector. In some implementations, a plurality of projectors 306 can be used.

A camera 310 can also be disposed within the chassis 304. The camera 310 is configured to image the scene in visible light wavelengths, non-visible light wavelengths, or both. The camera 310 has a camera field of view 312 that describes a particular solid angle. The camera field of view 312 can vary according to changes in the configuration of the camera 310. For example, an optical zoom of the camera can narrow the camera field of view 312. In some implementations, a plurality of cameras 310 can be used.

The chassis 304 can be mounted with a fixed orientation, or be coupled via an actuator to a fixture such that the chassis 304 can move. Actuators can include piezoelectric actuators, motors, linear actuators, and other devices configured to displace or move the chassis 304 or components therein such as the projector 306 and/or the camera 310. For example, in one implementation, the actuator can comprise a pan motor 314, tilt motor 316, and so forth. The pan motor 314 is configured to rotate the chassis 304 in a yawing motion. The tilt motor 316 is configured to change the pitch of the chassis 304. By panning and/or tilting the chassis 304, different views of the scene can be acquired. The user identification and authentication module 224 can use the different views to monitor users within the environment.

One or more microphones 318 can be disposed within the chassis 304 or within a microphone array 320 housed within the chassis or as illustrated, affixed thereto, or elsewhere within the environment. These microphones 318 can be used to acquire input from the user, for echolocation, to locate the source of a sound as discussed above, or to otherwise aid in the characterization of and receipt of input from the environment. For example, the user can make a particular noise, such as a tap on a wall or snap of the fingers, which are pre-designated to initiate an augmented reality function. The user can alternatively use voice commands. Such audio inputs can be located within the environment using time-difference-of-arrival (TDOAs) and/or volume-difference-at-arrival (VDAA) among the microphones and used to summon an active zone within the augmented reality environment. Further, the microphones 318 can be used to receive voice input from the user for purposes of identifying and authenticating the user. The voice input can be detected and a corresponding signal passed to the user identification and authentication module 224 in the computing device 206 for analysis and verification.

One or more speakers 322 can also be present to provide for audible output. For example, the speakers 322 can be used to provide output from a text-to-speech module, to playback pre-recorded audio, etc.

A transducer 324 can be present within the ARFN 204, or elsewhere within the environment, and configured to detect and/or generate inaudible signals, such as infrasound or ultrasound. The transducer can also employ visible or non-visible light to facilitate communication. These inaudible signals can be used to provide for signaling between accessory devices and the ARFN 204.

A ranging system 326 can also be provided in the ARFN 204 to provide distance information from the ARFN 204 to an object or set of objects. The ranging system 326 can comprise radar, light detection and ranging (LIDAR), ultrasonic ranging, stereoscopic ranging, and so forth. In some implementations, the transducer 324, the microphones 318, the speaker 322, or a combination thereof can be configured to use echolocation or echo-ranging to determine distance and spatial characteristics.

A wireless power transmitter 328 can also be present in the ARFN 204, or elsewhere within the augmented reality environment. The wireless power transmitter 328 is configured to transmit electromagnetic fields suitable for recovery by a wireless power receiver and conversion into electrical power for use by active components within the PADD 242. The wireless power transmitter 328 can also be configured to transmit visible or non-visible light to communicate power. The wireless power transmitter 328 can utilize inductive coupling, resonant coupling, capacitive coupling, and so forth.

In this illustration, the computing device 206 is shown within the chassis 304. However, in other implementations, all or a portion of the computing device 206 can be disposed in another location and coupled to the ARFN 204. This coupling can occur via wire, fiber optic cable, wirelessly, or a combination thereof. Furthermore, additional resources external to the ARFN 204 can be accessed, such as resources in another ARFN 204 accessible via a local area network, cloud resources accessible via a wide area network connection, or a combination thereof.

Also shown in this illustration is a projector/camera linear offset designated “O”. This is a linear distance between the projector 306 and the camera 310. Separating the projector 306 and the camera 310 at distance “O” aids in the recovery of structured light data from the scene. The known projector/camera linear offset “O” can also be used to calculate distances, dimensioning, and otherwise aid in the characterization of objects within the environment 200. In other implementations, the relative angle and size of the projector field of view 308 and camera field of view 312 can vary. In addition, the angle of the projector 306 and the camera 310 relative to the chassis 304 can vary.

Moreover, in other implementations, techniques other than structured light may be used. For instance, the ARFN may be equipped with IR components to illuminate the scene with modulated IR, and the system may then measure round trip time-of-flight (ToF) for individual pixels sensed at a camera (i.e., ToF from transmission to reflection and sensing at the camera). In still other implementations, the projector 306 and a ToF sensor, such as camera 310, may be integrated to use a common lens system and optics path. That is, the scatter IR light from the scene is collected through a lens system along an optics path that directs the collected light onto the ToF sensor/camera. Simultaneously, the projector 306 may project visible light images through the same lens system and coaxially on the optics path. This allows the ARFN to achieve a smaller form factor by using fewer parts.

In other implementations, the components of the ARFN 204 can be distributed in one or more locations within the environment 200. As mentioned above, microphones 318 and speakers 322 can be distributed throughout the scene 302. The projector 306 and the camera 310 can also be located in separate chassis 304.

Figure 4:
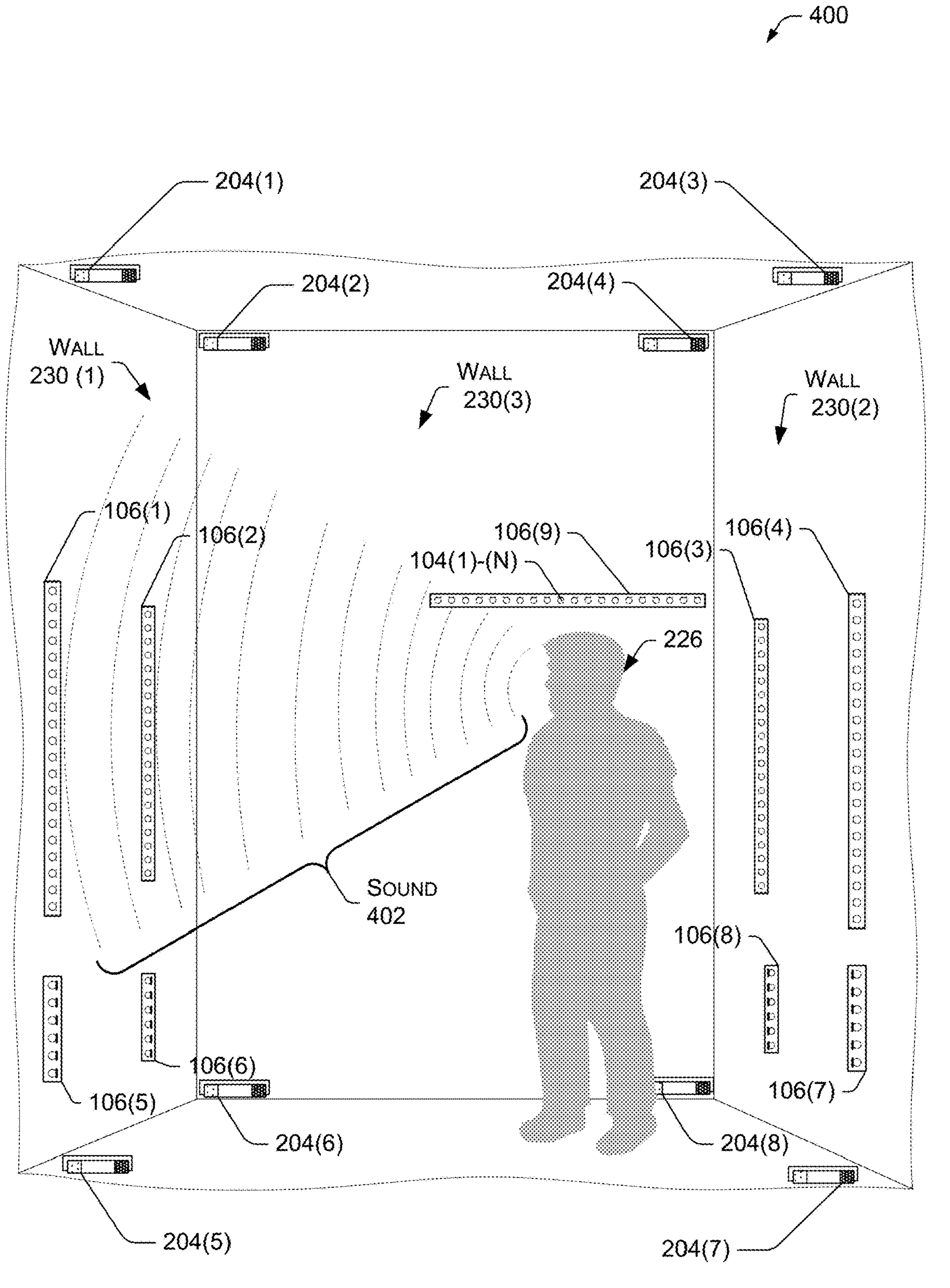
FIG. 4 illustrates microphone arrays and augmented reality functional nodes detecting voice sounds. The nodes also can be configured to perform user identification and authentication.

FIG. 4 illustrates multiple microphone arrays 106 and augmented reality functional nodes (ARFNs) 204 detecting voice sounds 402 from a user 226 in an example environment 400, which in this case is a room. As illustrated, eight microphone arrays 106(1)-(8) are vertically disposed on opposite walls 230(1) and 230(2) of the room, and a ninth microphone array 106(9) is horizontally disposed on a third wall 230(3) of the room. In this environment, each of the microphone arrays is illustrated as including six or more microphones 104. In addition, eight ARFNs 204(1)-(8), each of which can include at least one microphone or microphone array, are disposed in the respective eight corners of the room. This arrangement is merely representative, and in other implementations, greater or fewer microphone arrays and ARFNs can be included. The known locations of the microphones 104, microphone arrays 106, and ARFNs 204 can be used in localization of the sound source.

While microphones 104 are illustrated as evenly distributed within microphone arrays 106, even distribution is not required. For example, even distribution is not needed when a position of each microphone relative to one another is known at the time each microphone 104 detects the signal representing the sound. In addition, placement of the arrays 106 and the ARFNs 204 about the room can be random when a position of each microphone 104 of the array 106 or ARFN 204 relative to one another is known at the time each microphone 104 receives the signal corresponding to the sound. The illustrated arrays 106 can represent physical arrays, with the microphones physically encased in a housing, or the illustrated arrays 106 can represent logical arrays of microphones. Logical arrays of microphones can be logical structures of individual microphones that may, but need not be, encased together in a housing. Logical arrays of microphones can be determined based on the locations of the microphones, attributes of a signal representing the sound as generated by the microphones responsive to detecting the sound, model or type of the microphones, or other criteria. Microphones 104 can belong to more than one logical array 106. The ARFN nodes 204 can also be configured to perform user identification and authentication based on the signal representing sound 402 generated by microphones therein.

The user is shown producing sound 402, which is detected by the microphones 104 in at least the arrays 106(1), 106(2), and 106(5). For example, the user 226 can be talking, singing, whispering, shouting, etc.

Attributes of the signal corresponding to sound 402 as generated by each of the microphones that detect the sound can be recorded in association with the identity of the receiving microphone 104. For example, attributes such as detection time and volume can be recorded in datastore 122 or 220 and used for later processing to determine the location of the source of the sound. In the illustrated example, the location of the source of the sound would be determined to be an x, y, z, coordinate corresponding to the location at the height of the mouth of the user 226 while he is standing at a certain spot in the room.

Microphones 104 in arrays 106(1), 106(2), 106(5), 106(6), and 106(9) are illustrated as detecting the sound 402. Certain of the microphones 104 will generate a signal representing sound 402 at different times depending on the distance of the user 226 from the respective microphones and the direction he is facing when he makes the sound. For example, user 226 can be standing closer to array 106(9) than array 106(2), but because he is facing parallel to the wall on which array 106(9) is disposed, the sound reaches only part of the microphones 104 in array 106(9) and all of the microphones in arrays 106(1) and 106(2). The sound source locator system uses the attributes of the signal corresponding to sound 402 as it is generated at the respective microphones or microphone arrays to determine the location of the source of the sound.

Attributes of the signal representing sound 402 as generated at the microphones 104 and/or microphone arrays 106 can be recorded in association with an identity of the respective receiving microphone or array and can be used to inform selection of the locations of groups of microphones or arrays for use in further processing of the signal corresponding to sound 402.

In an example implementation, the time differences of arrival (TDOA) of the sound at each of the microphones in arrays 106(1), 106(2), 106(5), and 106(6) are calculated, as is the TDOA of the sound at the microphones in array 106(9) that generate a signal corresponding to the sound within a threshold period of time. Calculating TDOA for the microphones in array 106(9), 106(3), 106(4), 106(7), and 106(8) that generate the signal representing the sound after the threshold period of time can be omitted since the sound as detected at those microphones was likely reflected from the walls or other surfaces in environment 400. The time of detection of the sound can be used to filter from which microphones attributes will be used for further processing.

In one implementation, an estimated location can be determined based on the time of generation of a signal representing the sound at all of the microphones that detect the sound rather than a reflection of the sound. In another implementation, an estimated location can be determined based on the time of generation of the signal corresponding to the sound at those microphones that detect the sound within a range of time.

A sound source locator module 218 calculates the source of the sound based on attributes of the signal corresponding to the sound associated with selected microphone pairs, groups, or arrays. In particular, the sound source locator module 218 constructs a geometric model based on the locations of the selected microphones. Source locator module 218 evaluates the delays in detecting the sound or in the generation of the signals representing the sound between each microphone pair and can select the microphone pairs with performance according to certain parameters on which to base the localization. For example, below a threshold, shorter arrival time delays can present an inverse relationship to sound distortion. In particular, shorter arrival time delays can constitute a larger distortion in the overall sound source location evaluation. Thus, the sound source locator module 218 can base the localization on TDOAs for microphone pairs that are longer than a base threshold and refrain from basing the localization on TDOAs for microphone pairs that are shorter than the base threshold.

Figure 5:
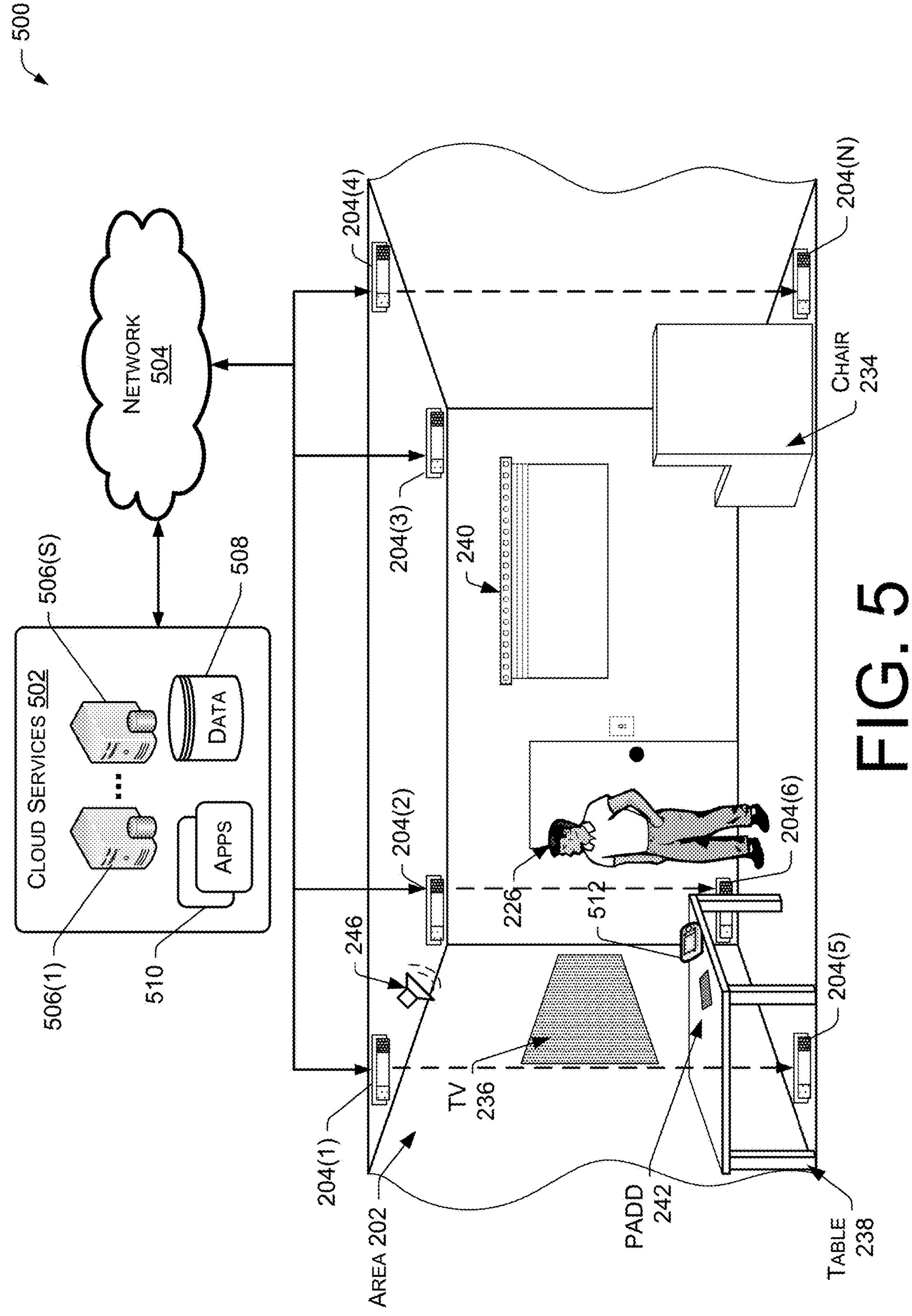
FIG. 5 shows an architecture having one or more augmented reality functional nodes connectable to cloud services via a network.

FIG. 5 shows an architecture 500 in which the ARFNs 204(1)-(4) residing in the room are further connected to cloud services 502 via a network 504. In this arrangement, the ARFNs 204(1)-(N) can be integrated into a larger architecture involving the cloud services 502 to provide an even richer user experience. Cloud services generally refer to the computing infrastructure of processors, storage, software, data access, and so forth that is maintained and accessible via a network such as the Internet. Cloud services 502 do not require end-user knowledge of the physical location and configuration of the system that delivers the services. Common expressions associated with cloud services include "on-demand computing," "software as a service (SaaS)," "platform computing," and so forth.

As shown in FIG. 5, the cloud services 502 can include processing capabilities, as represented by servers 506(1)-(S), and storage capabilities, as represented by data storage 508. Applications 510 can be stored and executed on the servers 506(1)-(S) to provide services to requesting users over the network 504. Essentially any type of application can be executed on the cloud services 502.

One possible application is the sound source location module 218 that may leverage the greater computing capabilities of the services 502 to more precisely pinpoint the sound source and compute further characteristics, such as sound identification, matching, and so forth. These computations may be made in parallel with the local calculation n at the ARFNs 204. Other examples of cloud services applications include sales applications, programming tools, office productivity applications, search tools, mapping and other reference applications, media distribution, social networking, and so on.

The network 504 is representative of any number of network configurations, including wired networks (e.g., cable, fiber optic, etc.) and wireless networks (e.g., cellular, RF, satellite, etc.). Parts of the network can further be supported by local wireless technologies, such as Bluetooth, ultra-wide band radio communication, wifi, and so forth.

By connecting ARFNs 204(1)-(N) to the cloud services 502, the architecture 500 allows the ARFNs 204 and computing devices 206 associated with a particular environment, such as the illustrated room, to access essentially any number of services. Further, through the cloud services 502, the ARFNs 204 and computing devices 206 can leverage other devices that are not typically part of the system to provide secondary sensory feedback. For instance, user 226 can carry a personal cellular phone or portable digital assistant (PDA) 512. Suppose that this device 512 is also equipped with wireless networking capabilities (wifi, cellular, etc.) and can be accessed from a remote location. The device 512 can be further equipped with an audio output components to emit sound, as well as a vibration mechanism to vibrate the device when placed into silent mode. A portable laptop (not shown) can also be equipped with similar audio output components or other mechanisms that provide some form of non-visual sensory communication to the user 226.

With architecture 500, these devices can be leveraged by the cloud services to provide forms of secondary sensory feedback. For instance, the user's PDA 512 can be contacted by the cloud services via a cellular or wifi network and directed to vibrate in a manner consistent with providing a warning or other notification to the user while the user is engaged in an activity, for example in an augmented reality environment. As another example, the cloud services 502 can send a command to the computer or TV 236 to emit some sound or provide some other non-visual feedback in conjunction with the visual stimuli being generated by the ARFNs 204.

Illustrative Processes

Figure 6:
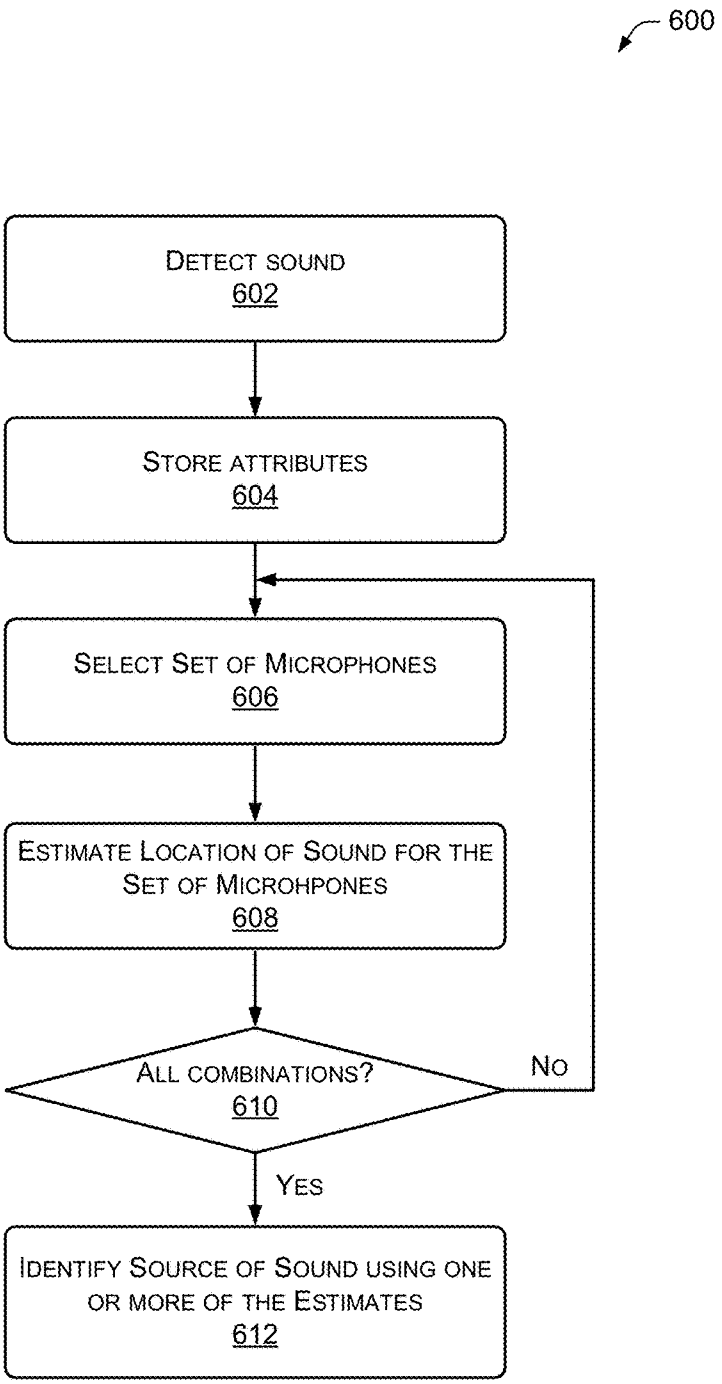
FIG. 6 is a flow diagram showing an illustrative process of selecting a combination of microphones.
Figure 7:
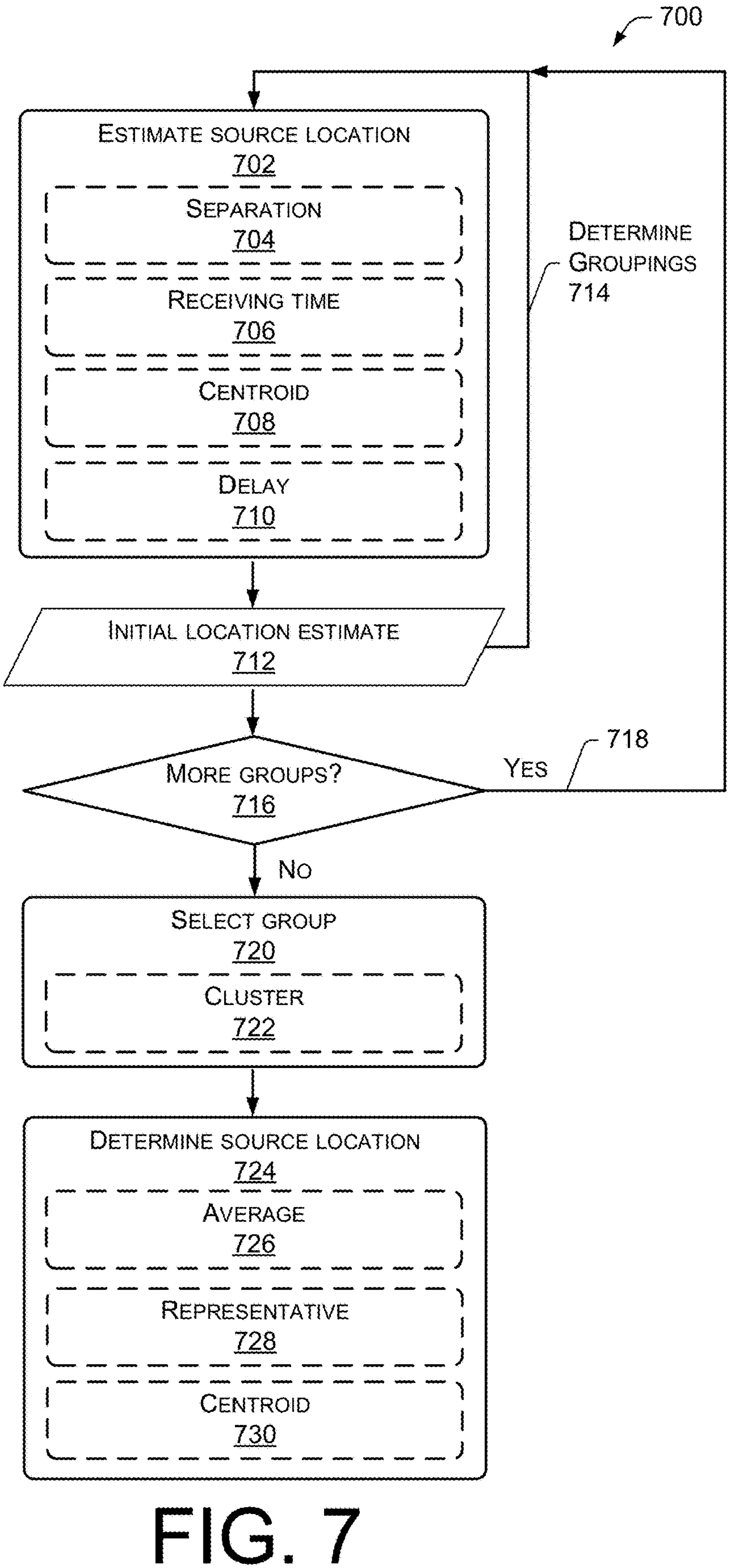
FIG. 7 is a flow diagram showing an illustrative process of locating a sound source.

FIGS. 6 and 7 show illustrative processes 600 and 700 that can be performed together or separately and can be implemented by the architectures described herein, or by other architectures. These processes are illustrated as a collection of blocks in a logical flow graph. Some of the blocks represent operations that can be implemented in hardware, software, or a combination thereof. In the context of software, the blocks represent processor-executable instructions stored on one or more computer-readable storage media that, when executed by one or more processors, perform the recited operations. Generally, processor-executable instructions include routines, programs, objects, components, data structures, and the like that cause a processor to perform particular functions or implement particular abstract data types. The order in which the operations are described is not intended to be construed as a limitation, and any number of the described blocks can be combined in any order or in parallel to implement the processes. It is understood that the following processes can be implemented with other architectures as well.

FIG. 6 shows an illustrative process 600 of selecting a combination of microphones for locating a sound source.

At 602, a microphone detects a sound. The microphone is associated with a computing device and can be a standalone microphone or a part of a physical or logical microphone array. In some implementations described herein, the microphone is a component in an augmented reality environment. In some implementations described herein, the microphone is contained in or affixed to a chassis of an ARFN 204 and associated computing device 206.

At 604, the microphone or computing device generates a signal corresponding to the sound being detected for further processing. In some implementations, the signal being generated represents various attributes associated with the sound.

At 606, attributes associated with the sound, as detected by the microphones, are stored. For instance, the datastore 122 or 220 stores attributes associated with the sound such as respective arrival time and volume, and in some instances the signal representing the sound itself. The datastore stores the attributes in association with an identity of the corresponding microphone.

At 608, a set of microphones is selected to identify the location of the sound source. For instance, the sound source location module 120 may select a group of five or more microphones from an array or set of arrays.

At 610, the location of the source is estimated using the selected set of microphones. For example, a source locator module 120 or 218 calculates time-differences-of-arrival (TDOAs) using the attribute values for the selected set of microphones. The TDOAs may also be estimated by examining the cross-correlation values between the waveforms recorded by the microphones. For example, given two microphones, only one combination is possible, and the source locator module calculates a single TDOA. However, with more microphones, multiple permutations can be calculated to ascertain the directionality of the sound.

At 612, the sound source locator module 120 or 218 ascertains if all desired combinations or permutations have been processed. As long as combinations or permutations remain to be processed (i.e., the "no" branch from 610), the sound source locator module iterates through each of the combinations of microphones.

For example, given N microphones, to account for each microphone, at least N−1 TDOAs are calculated. In at least one implementation, N can be any whole number greater than five. In a more specific example, N equals six. In this example, disregarding directionality, five TDOAs are calculated. Adding directionality adds to the number of TDOAs being calculated. While we will use this minimal example, throughout the remainder of this disclosure, those of skill in the art will recognize that many more calculations are involved as the number of microphones and their combinations and permutations correspondingly increase.

At 614, when the TDOA of all of the desired combinations and permutations have been calculated, the sound source locator module 120 or 218 selects a combination determined to be best to identify the location of the source of the sound.

FIG. 7 shows an illustrative process 700 of locating a sound source using a plurality of spaced or distributed microphones or arrays. This process 700 involves selecting different sets of microphones to locate the sound, akin to the process 600 of FIG. 6, but further describes possible techniques to optimize or make a more effective selection of which sets of microphones to use.

At 702, the process estimates a source location of sound to obtain an initial location estimate. In one implementation, the sound source locator module 120 or 218 estimates a source location from a generated signal representing attributes of sound as detected at a plurality of microphones. The microphones can be individually or jointly associated with a computing device and can be singular or a part of a physical or logical microphone array.

Localization accuracy is not the primary goal of this estimation. Rather, the estimation can be used as a filter to decrease the number of calculations performed for efficiency while maintaining increased localization accuracy from involving a greater number of microphones or microphone arrays in the localization problem.

In most cases, a number of microphones (e.g., all of the microphones) are employed to estimate the location of the sound source. In one implementation, to minimize computational costs and to optimize the accuracy of estimation, the time delays of these large numbers of microphones can be determined or accessed and an initial location can be estimated based on the time delays.

While this initial location estimate may be close to the source location given that some or all of the microphones are used in the estimation, the initial location estimate might not be optimized because the microphones provide the TDOA were not well selected.

With the initial location estimate, those microphones having larger TDOA values with respect to the initial location estimate can be selected for a more accurate location estimate. A larger TDOA value reflects a larger distance from the sound source location. The selection of such value depends on the initial sound source location estimate and is performed after an initial location is estimated.

For example, given the known locations of the microphones, a location p0, with coordinates x0, y0, and z0, can be estimated using a variety of techniques such as from a geometric model of sets of two of the microphone locations and the average times that these sets of microphones detected the sound.

In the estimation phase, at 704, the sound source locator module 120 or 218 accesses separation information about the microphones either directly or by calculating separation based on the locations of the microphones to estimate the location of the source of the sound.

As another example, at 706, the source locator module 120 or 218 estimates the location of the source of the sound based on times the sound is detected at respective microphones and/or respective times the signals corresponding to the sound are generated by the respective microphones.

As yet another example, at 708, the source locator module 120 or 218 estimates the location of the source of the sound based on estimating a centroid, or geometric center between the microphones that generate a signal corresponding to the sound at substantially the same time.

In addition, as in the example introduced earlier, at 710 the source locator module 120 or 218 estimates the location of the source of the sound based on time delay between pairs of microphones generating the signal representing the sound. For example, the source locator module 120 or 218 calculates a time delay between when pairs of microphones generate the signal corresponding to the sound to determine the initial location estimate 712.

In one implementation, the initial location estimate 712 can be based on a clustering of detection times, and the initial location estimate 712 can be made based on an average of a cluster or on a representative value of the cluster.

At loop 714, groupings of less than all of the microphones or microphone arrays are determined to balance accuracy with processing resources and timeliness of detection. The sound source locator module 120 or 218 determines groupings by following certain policies that seek to optimize selection or at least make the processes introduced for estimation more efficient and effective without sacrificing accuracy. The policies may take many different factors into consideration including the initial location estimate 712, but the factors generally help answer the following question: given a distribution area containing microphones at known locations, what groups of less than all of the microphones should be selected to best locate the source of the sound? Groups can be identified in various ways alone or in combination.

For example, grouping can be determined based on the initial location estimate 712 and separation of the microphones or microphone arrays from each other. In the grouping determination iteration, at 704, the sound source locator module 120 or 218 determines a grouping of microphones that are separated from each other and the initial location estimate 712 by at least a first threshold distance.

As another example, grouping can be determined based on the initial location estimate 712 and microphones having a later detection time of the signal corresponding to the sound. At 706, the source locator module 120 or 218 determines a grouping of microphones or microphone arrays according to the initial location estimate 712 and times the sound is detected at respective microphones and/or respective times the signal representing the sound are generated by the respective microphones, which in some cases can be more than a minimum threshold time up to a latest threshold time. A predetermined range of detection and/or generation times may dictate which microphones to selectively choose. Microphones with detection and/or generation times that are not too quick and not too late tend to be suitable for making these computations. Such microphones allow for a more accurate geometrical determination of the location of the sound source. Microphones with very short detection and/or generation times, or with excessively late detection and/or generation times, may be less suitable for geometric calculations, and hence preference is to avoid selecting these microphones at least initially.

As another example, grouping can be determined based on the initial location estimate 712 and delay between pairs of microphones generating the signal corresponding to the sound. At 710, source locator module 120 or 218 calculates a time delay between when pairs of microphones generate the signal representing the sound. In some instances, the sound source locator module 120 or 218 compares the amount of time delay and determines a grouping based on time delays representing a longer time. Choosing microphones associated with larger absolute TDOA values is advantageous since the impact of measurement errors is smaller, leading therefore to more accurate location estimates.

After an initial location estimate is identified for the group, at 712, whether more groups should be determined is decided at 716. Whether or not more groups are determined can be based on a predetermined number of groups or a configurable number of groups. Moreover, in various implementations the number of groups chosen can be based on convergence, or lack thereof, of the initial location estimates of the groups already determined. When the decision calls for more groups, the process proceeds through loop 718 to determine an additional group. When the decision does not call for more groups, the process proceeds to selecting one or more groups from among the determined groupings.

At 720, the groups of microphones are selected. In the continuing example, the sound source locator module 120 or 218 selects one or more of the groups that will be used to determine the location of the source of the sound. For example, a clustering algorithm can be used to identify groups that provide solutions for the source of the sound in a cluster. At 722, source locator module 120 or 218 applies a clustering function to the solutions for the source identification to mitigate the large number of possible solutions that might otherwise be provided by various combinations and permutations of microphones. By employing a clustering algorithm, solutions that have a distance that is close to a common point are clustered together. The solutions can be graphically represented using the clustering function, and outliers can be identified and discarded.

At 724, the sound source locator module 120 or 218 determines a probable location of the sound source from calculations of the selected groups. Various calculations can be performed to determine the probable location of the source of the sound based on the selected group. For example, as shown at 726, an average solution of the solutions obtained by the groups can be output as the probable location. As another example, as shown at 728, a representative solution can be selected from the solutions obtained by the groups and output as the probable location. As yet another example, at 730, source locator module 120 or 218 applies a centroid function to find the centroid, or geometric center, to determine the probable location of the sound source according to the selected group. By considering the room in which the source is located as a plane figure, the centroid is calculated from an intersection of straight lines that divide the room into two parts of equal moment about the line. Other operations to determine the solution are possible, including employing three or more sensors for two-dimensional localization using hyperbolic position fixing. That is, the techniques described above may be used to locate a sound in either two-dimensional space (i.e., within a defined plane) or in three-dimensional space.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:

one or more processors; and one or more computer-readable media storing instructions that, when executed by the one or more processors, cause the one or more processors to perform operations comprising:

receiving first audio data from a first device comprising one or more first microphones, the first audio data representing a voice command received at the first device;

receiving second audio data from one or more second microphones, the second audio data representing the voice command;

determining, based at least in part on the first audio data and the second audio data, that the one or more first microphones are located closer to a source of the voice command than the one or more second microphones;

selecting the first device to output a response to the voice command, from multiple devices including the first device and a second device associated with the one or more second microphones, based at least in part on the one or more first microphones being determined to be located closer to the source of the voice command than the one or more second microphones; and causing, based at least in part on the first device being selected to output the response to the voice command, the first device to output the response to the voice command.

2. The system of claim 1, the operations further comprising:

determining a first attribute associated with the first audio data; and determining a second attribute associated with the second audio data, wherein determining that the one or more first microphones are located closer to the source of the voice command than the one or more second microphones is based at least in part on the first attribute and the second attribute.

3. The system of claim 1, the operations further comprising:

determining a first volume associated with the first audio data; and determining a second volume associated with the second audio data, wherein determining that the one or more first microphones are located closer to the source of the voice command than the one or more second microphones is based at least in part on the first volume and the second volume.

4. The system of claim 1, the operations further comprising:

determining a first time that the first audio data was generated; and determining a second time that the second audio data was generated, wherein determining that the one or more first microphones are located closer to the source of the voice command than the one or more second microphones is based at least in part on the first time and the second time.

5. The system of claim 1, the operations further comprising:

determining, based at least in part on the first audio data, a first distance associated with the one or more first microphones and the source of the voice commands; and determining, based at least in part on the second audio data, a second distance associated with the one or more second microphones and the source of the voice command, wherein determining that the one or more first microphones are located closer to the source of the voice command than the one or more second microphones is based at least in part on the first distance and the second distance.

6. The system of claim 1, the operations further comprising:

determining a time difference between receiving the first audio data and receiving the second audio data, wherein determining that the one or more first microphones are located closer to the source of the voice command than the one or more second microphones is based at least in part on the time difference.

7. The system of claim 1, the operations further comprising sending data representing the response for output on the first device.

8. A method comprising:

receiving first audio data from a first device comprising one or more first microphones, the first audio data representing a voice command;

receiving second audio data from one or more second microphones, the second audio data representing the voice command;

determining a first attribute associated with the first audio data;

determining a second attribute associated with the second audio data;

selecting the first device to provide a response to the voice command, from multiple devices including the first device and a second device associated with the one or more second microphones, based at least in part on the first attribute and the second attribute; and causing, based at least in part on the first device being selected to provide the response, the first device to output the response to the voice command.

9. The method of claim 8, wherein:

determining the first attribute comprises determining a first volume of the first audio data;

determining the second attribute comprises determining a second volume of the second audio data; and selecting the first device is based at least in part on the first volume and the second volume.

10. The method of claim 8, wherein:

determining the first attribute comprises determining a first time that the first audio data was generated;

determining the second attribute comprises determining a second time that the second audio data was generated; and selecting the first device is based at least in part on the first time and the second time.

11. The method of claim 8, wherein:

determining the first attribute comprises determining a first distance associated with the one or more first microphones and a source of the voice command;

determining the second attribute comprises determining a second distance associated with the one or more second microphones and the source of the voice command; and selecting the first device is based at least in part on the first distance and the second distance.

12. The method of claim 8, further comprising:

determining, based at least in part on the first attribute and the second attribute, that the one or more first microphones are located closer to a source of the voice command than the one or more second microphones, wherein selecting the first device is based at least in part on the one or more first microphones being located closer to the source of the voice command than the one or more second microphones.

13. The method of claim 8, further comprising generating the response to the voice command for the first device.

14. A system comprising:

one or more processors; and one or more computer-readable media storing instructions that, when executed by the one or more processors, cause the one or more processors to perform operations comprising:

receiving first audio data from a first device comprising one or more first microphones, the first audio data representing a voice command;

receiving second audio data from one or more second microphones, the second audio data representing the voice command;

determining a first attribute associated with the first audio data;

determining a second attribute associated with the second audio data;

selecting the first device to output a response to the voice command, from multiple devices including the first device and a second device associated with the one or more second microphones, based at least in part on the first attribute and the second attribute; and causing, based at least in part on selecting the first device to output the response to the voice command, the first device to output the response.

15. The system of claim 14, wherein:

determining the first attribute comprises determining a first volume of the first audio data;

determining the second attribute comprises determining a second volume of the second audio data; and selecting the first device is based at least in part on the first volume and the second volume.

16. The system of claim 14, wherein:

determining the first attribute comprises determining a first time that the first audio data was generated;

determining the second attribute comprises determining a second time that the second audio data was generated; and selecting the first device is based at least in part on the first time and the second time.

17. The system of claim 14, wherein:

determining the first attribute comprises determining a first distance associated with the one or more first microphones and a source of the voice command;

determining the second attribute comprises determining a second distance associated with the one or more second microphones and the source of the voice command; and selecting the first device is based at least in part on the first distance and the second distance.

18. The system of claim 14, the operations further comprising:

determining, based at least in part on the first attribute and the second attribute, that the one or more first microphones are located closer to a source of the voice command than the one or more second microphones, wherein selecting the first device is based at least in part on the one or more first microphones being located closer to the source of the voice command than the one or more second microphones.

19. The system of claim 14, the operations further comprising generating the response for the first device.

20. The system of claim 14, further comprising the one or more second microphones.

* * * * *